United States Patent [19]

Muller

[11] 3,867,116

[45] Feb. 18, 1975

[54] SEPARATOR

[75] Inventor: Horst Müller, Forch, Switzerland

[73] Assignee: Swiss Aluminum Ltd., Chippis, Switzerland

[22] Filed: Dec. 6, 1972

[21] Appl. No.: 312,697

[30] Foreign Application Priority Data

Dec. 10, 1971 Switzerland................ 18027/71

[52] U.S. Cl.............. 55/319, 55/341, 55/431, 55/466, 209/143
[51] Int. Cl............................................ B01d 50/00
[58] Field of Search .......... 55/77, 98, 99, 181, 302, 55/341, 474, 431, 428, 319, 466; 302/59; 141/93; 222/89 S; 34/10, 37, 57, 165; 285/133 R; 209/474, 143, 488, 497, 499

[56] References Cited
UNITED STATES PATENTS

| 3,541,768 | 11/1970 | Wilson | 55/319 X |
| 3,739,557 | 6/1973 | Renko et al. | 55/319 X |

Primary Examiner—Frank W. Lutter
Assistant Examiner—David L. Lacey
Attorney, Agent, or Firm—Ernest F. Marmorek

[57] ABSTRACT

An apparatus for separating fine-grained material out of a stream of the material in air comprising a housing, a conveyer pipe extending into the housing and having an open outlet end within the housing and surrounded with an axially open expansion pipe for main separation of air and fine grained material: an inner partition wall for limiting a flow path for the separated air to the air filters, a floor with fluidizing means for conveying the separated grain material below the said partition wall and further above the edge of another wall extending upwards from the floor to the discharge openings; the apparatus comprising furthermore air outlets in the head beyond the filter means, and a further group of filter means located between the said partition wall and the outer wall of the housing the outlet of these filter means being also communicated to the said air outlet which is provided with a suction device.

12 Claims, 4 Drawing Figures

SEPARATOR

This invention relates to separators for separating out finegrained material out of a stream of the material in air.

The loading of fine-grained materials, such for example as aluminum oxide, cement, or similar fluidizable materials, into ships, railway wagons, or other transport means, requires special precautions for avoidance of damage produced by dust, namely damage to the surroundings, and injury to the transport means and loading devices.

Thus, hatch openings of ships and loading openings on other transport means are, upon connection of a conveyor pipe of a loading device, covered with tarpaulins, in order to hinder the rising of dust out of the openings and its distribution into the surroundings. This precaution has appeared to be inadequate, because, corresponding to the increase in size of hatch openings, and having regard to all necessary directions of movement of the conveyor pipe, tarpaulins must be employed of such a size that they become troublesome to manipulate. Moreover, in the employment of covering tarpaulins, precautions have to be met against weather effects, and the tarpaulins, must undergo a time-consuming cleaning after use. The circumstances are similar in loading of railway or road vehicles, so that altogether the defects attached to tarpaulins are detrimental to a rational loading of materials tending to generate dust.

If one wishes to take off a partial stream from a conveying stream difficulties arise. One avoids these difficulties in that either one delivers from a silo a partial quantity, or one undertakes a division of the conveyed stream at a silo entry, while at both the silo and the delivery point of the partial stream great expenditure must be laid out for suppression of generation of dust.

The object of this invention is to provide a separator which can be attached at a desired point to a substantially vertically extending conveyor pipe of a loading device, for separation of air and conveyed material and if required for taking off a partial stream from the conveying stream. The object is attained in that the separator comprises a housing including a circumferential wall, a head, and a floor, an inlet in the housing, a conveyor pipe extending into the housing through the inlet and having an open outlet end within the housing, an axially open expansion pipe surrounding the open end of the conveyor pipe, an air outlet in the head, means connected to the air outlet capable of extracting air to thereby establish and maintain a reduced pressure within the housing, filter means between the air outlet and the major part of the interior of the housing, at least one material discharge opening in the lower part of the circumferential wall, and inlet means associated with the floor for admitting fluidizing air into the housing, for conveying the separated fine grained material to the discharge opening.

By means of such apparatus, the conveyed material is separated from an air stream carried along a conveyor path, i.e. accompanying the conveyed material, in a substantially closed housing, so that the air can be released into the surroundings cleaned by filters, and the separated material can, by means of fluidization but separated from any accompanying air stream, be discharged from the housing, with suppression of generation of dust. If there are several discharge openings, it is possible to take off a partial stream from each opening. The separation takes place by a reduction of the kinetic energy residing in the stream of material and air; the resulting air is sucked away, and the material is conveyed further with a reduced energy content, by means of a subsidiary fludization which starts before the point of energy conversion, so that a continous flow is ensured. By the reduction of the energy content of the material, generation of dust is as far as possible suppressed during a loading operation.

The accompanying drawings show some examples of apparatus embodying the present invention. In these drawings.

Figure 1:
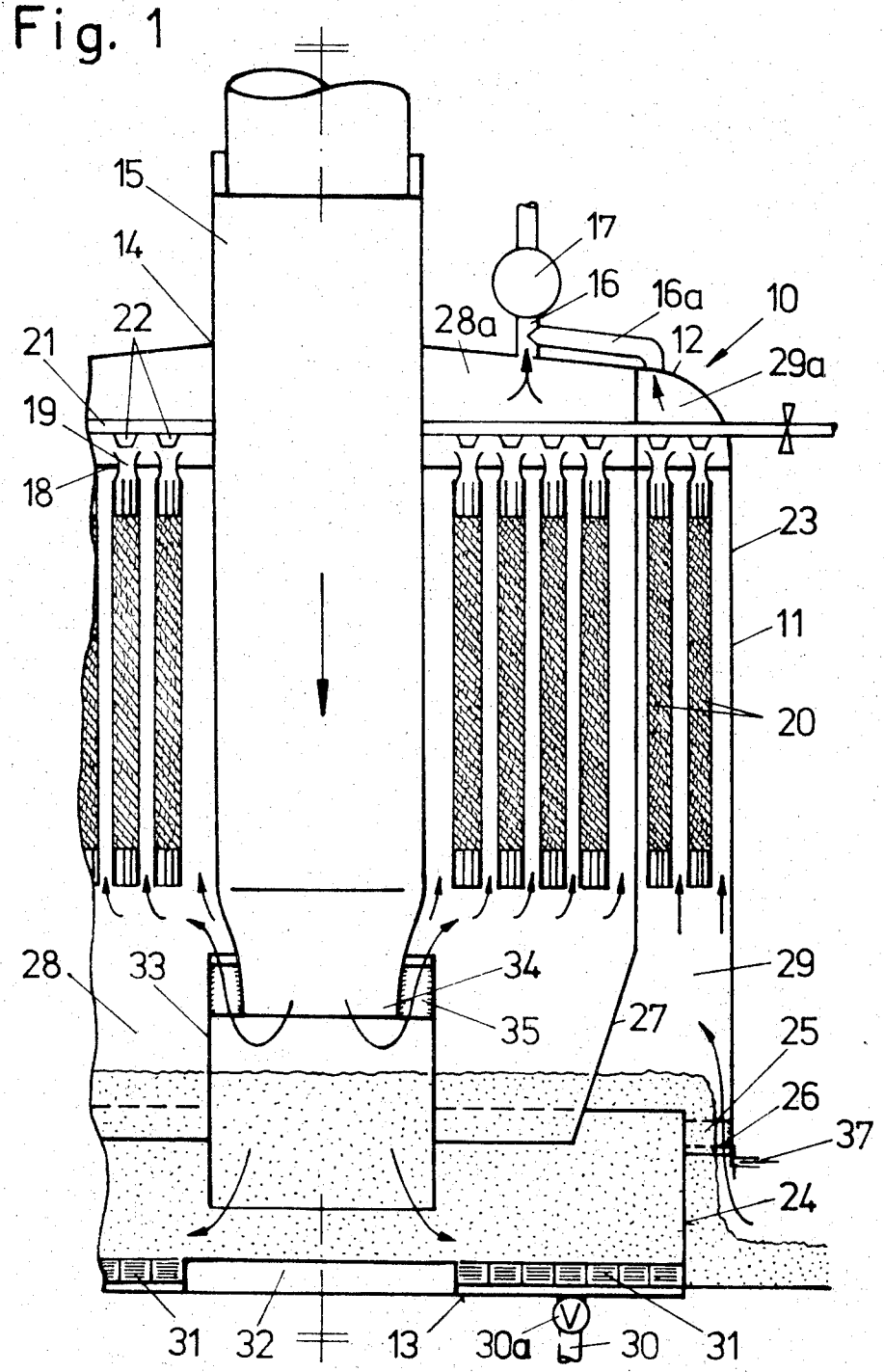
FIG. 1 is a side view of a first apparatus, partly in section.

The separator 10 shown in FIG. 1 consists of a substantially closed housing, which includes a circumferential wall 11, a head 12 and a floor 13. In the middle of the head 12 there is an inlet 14, into which is inserted the conveyor pipe 15 of a loading device. An outlet 16 connects the interior of the separator 10 with the surroundings. Onto the outlet 16 there is connected a suction device 17, which produces and maintains within the separator 10 a desired reduced pressure. In the head part of the separator 10 there is located a perforated plate 18 which abuts the circumference of the container and surrounds the delivery pipe 15. The openings of this plate are formed as venturi tubes. In the direction towards the floor 13 of the separator 10, filter hoses 20 hang on the outer circumference of the venturi tubes, and these hoses are tensioned by a supporting device not shown. Above the perforated plate 18 there are arranged compressed air pipes 21 with nozzles 22. Each nozzle 22 is directed at an opening 19 in the perforated plate 18, i.e. at a respective venturi tube. The compressed air pipes and thus the nozzles are only actuated from time to time, that is to say for cleaning the filter hoses 20. The compressed air emerging from the nozzles flows into the venturi tubes and produces at the end of the tubes a pressure shock which frees the filter hoses from adherent dust particles.

Preferably, as shown, the housing is assembled from two housing parts placed one inside the other, that is to say an upper housing part 23 which is connected with the conveyor pipe 15, and a lower housing part 24 of smaller diameter than the upper part, inserted into the upper housing part 23. The upper housing part 23 is open downwards, while the lower housing part 24 is open upwards. The housing parts 23 and 24 are connected together by struts 25, which each are attached to the outer circumference of the lower housing part and the inner circumference of the upper housing part. The housing part 24 engages for a small length in the open end of the upper housing part 23, so that between the inner circumference of the housing part 23 and the outer circumference of the housing part 24 an annular discharge opening 26 is formed, interrupted by the struts 25, through which the fluidized material can leave the separator 10. There exists also the possibility of fastening the housing part 24 with suitable means directly to the expansion pipe 33 (described below).

A second wall 27 is arranged within the housing, spaced from and concentric with the circumferential wall extending downwards from the head and penetrating the perforated plate 18. The wall extends at least to the lower boundary of the discharge opening 26. Consequently the only material that can reach the discharge opening is fluidized material rising upwards. This means that the kinetic energy of the material entering the housing through the conveyor pipe 15 is largely converted into potential energy, so that the only energy available to generate dust is that due to the static head of the material between the walls 27 and 11. In the neighborhood of its lower edge, the wall 27 is formed extending at an angle in the direction towards the center of the housing 10, so that a sufficiently large cross section is provided for upward flow towards the annular discharge opening 26. The wall 27 divides the upper part of the housing into two concentric annular spaces, that is an inner annular space 28 and an outer annular space 29, which are intersected horizontally in the upper part of the separator by the perforated plate 18, with formation of annular spaces 28a and 29a. A pipe 16a connects the annular space 29a with the discharge 16, and the pipe 16a opens into the discharge 16 before the suction device 17. The filter hoses 20 lie in upper zones of the annular spaces 28 and 29.

Figure 2:
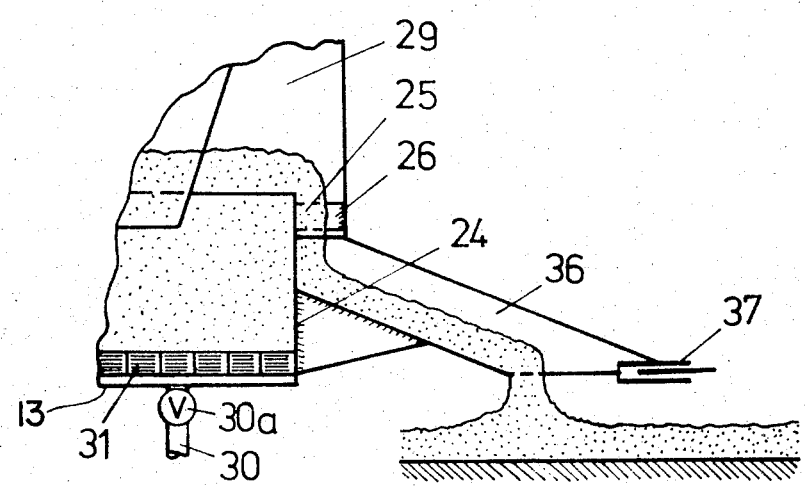
FIG. 2 is a fragmentary view of a modified embodiment.
Figure 3:
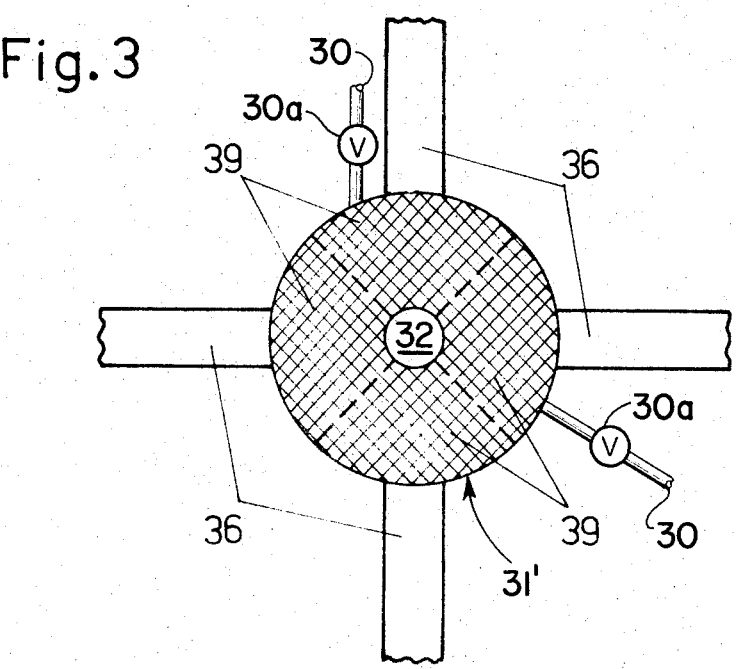
FIG. 3 is a plan of the embodiment according to FIG. 2, in a smaller scale than shown in FIG. 2.

For withdrawal of a partial stream, the flow trough 36 shown in FIG. 2 can be employed. This is connected to the discharge opening 26, and is arranged extending radially and obliquely downwards. There also exists the possbility of providing several of such flow troughs 36 along the circumference of the discharge opening, as shown in FIG. 3. If the separator 10 is only intended for division of a flow of conveyed material into individual partial streams, then one can dispense with separate inner and outer housing parts, and instead have a closed housing. Then several separate discharge openings are made in the circumferential wall 11, to which the flow troughs 36 can be connected.

The downstream end of the annular discharge opening 26 is provided with a damper 37, by which the cross section of the downstream end of the annular discharge opening 26 can be increased or decreased. With a reduced output through the separator, one will reduce the area of the annular discharge opening, because a greater unused residual cross section would have as consequence an insufficient velocity of the sucked-in surrounding air. In the contrary case, one will correspondingly increase the unused residual cross section by withdrawal of the damper 37. Dampers 37 are also provided at the discharge ends of the flow troughs 36, for influencing the remaining unused residual cross section.

Figure 3A:
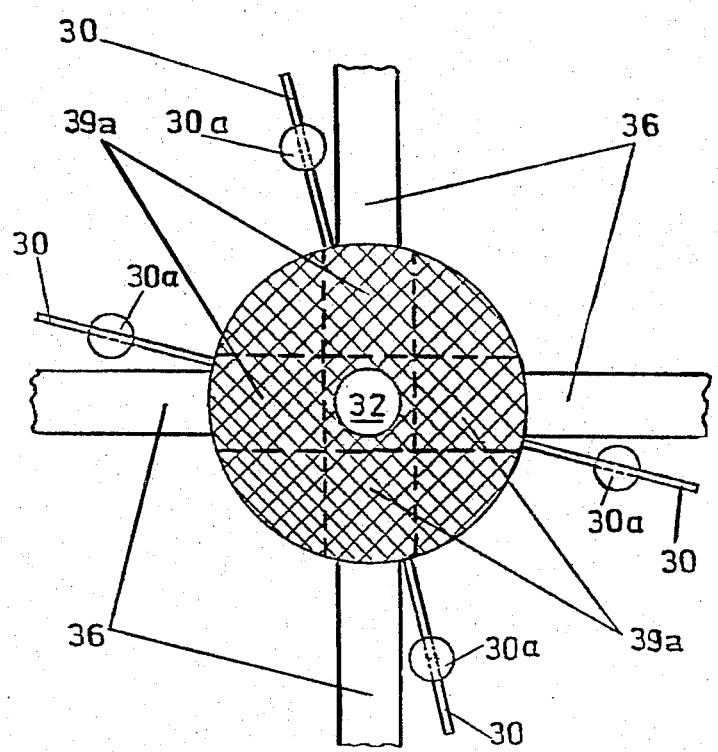
FIG. 3a is a plan view showing another embodiement of the fluidizing means.

In the floor 13 of the lower housing part 24 there is a fluidization air inlet 30 with a control device 30a, which introduces air under pressure into a fluidizing means 31, which is arranged on the inner surface of the floor 13. FIG. 3 shows the fluidizing means 31' subdivided, corresponding to the indicated number of flow troughs 36, into segments 39, which can be pressurised either in unison or singly with compressed air. Furthermore the fluidizing means consisting of segments can be pressurised by means of the control device 30a with additional air loading; for example one or more segments can be supplied with an additional quantity of air for production of a greater flow volume in one or more flow channels. The fluidizing means 31 can also be formed as shown in FIG. 3a of several radially extending fluidizing troughs 39a on the floor 13, which can be supplied through fluidizing air inlets 30, with compressed air in unison or in segments for discharge of the material.

With fluidizable materials it is mostly a matter of strongly abrasive materials. For protection of the housing and the fluidising devices against the abrasive action, a wear plate 32 is arranged on the inner surface of the floor 13, and directly beneath the expansion pipe 33. Preferably the wear plate 32 is fastened replaceably on the floor 13. FIG. 1 shows the wear plate 32 in cylindrical form. Instead of a wear plate formed cylindrically, with two end surfaces in parallel planes, one can also be used which is conical, extending upwards in the direction towards the outlet end of the expansion pipe 33.

The outlet end 34 of the conveyor pipe 15 opens into an expansion pipe 33. The conveyor pipe 15 penetrates the upper housing part for the length of the filter hoses, in such a way that a sufficient space is available for the separated air to flow to the filter 20. The outlet end 34 of the conveyor pipe, and the expansion pipe 33, are connected together by struts 35, so that an annular gap occurs between the outer surface of the outlet end 34, which extends somewhat into the expansion pipe 33, and the inner surface of the expansion pipe 33, for conveyance of air from the stream in the direction towards the filter. The effect of achieving, by a change of velocity of the air stream, the release of the solid material held in it, is further assisted if the outlet end is formed, as FIG. 1 shows, in the form of a nozzle.

The apparatus operates in the following way:

Material to be conveyed, as for example aluminum oxide or cement, enters into the separator 10 through the conveyor pipe 15 of a loading device. At the lower end of the expansion pipe 33 an energy conversion takes place, which releases a principal part of the air. Furthermore the air experiences at the outlet end 34 a reduction of velocity, which allows conveyed material held in it to fall in the direction towards the lower end of the expansion pipe. The thus separated predominant part of the air rises through the annular gap between the outlet end 34 and the expansion pipe 33 in the direction towards the perforated plate 18. Assisted by the reduced pressure maintained in the separator 10, i.e. in the chambers 28a, 29a, by the suction device 17, the air is drawn through the filter hoses 20 of the inner annular chamber 28, and dust particles entrained with it become trapped in the fabric of the filter hoses 20. The entirely cleaned air then flows through the perforated plate 18, i.e. through the venturi tubes of the openings 19, into the annular chanber 28a, and thence through the outlet 16 and the suction device 17 into the surroundings. The fine-grained material separated from the accompanying air stream, flowing out from the gap between the lower end of the expansion pipe 33 and the wear plate 32, collects on the floor 13 of the lower housing part 24.

Without further measures for transport of the conveyed material introduced into the separator the latter would become choked and ineffective. So that the material can be carried to discharge through the annular discharge opening 26, it is brought into a fluidized condition, by introduction of fluidizing air through the floor 13, so that it begins to flow like water. At the same time the component of the accompanying air stream still mixed with the material and trapped within it, that is to say the remaining residuum which cannot be completely separated by the energy conversion, is thereby released and carried to the filter.

As the material is discharged from the lower housing part 24, there results a continuous further flow of the material out of the expansion pipe 33 in the direction towards the fluidizing floor. Then the wall 27 causes the flow direction of the fluidized material to turn through substantially 180°, so that the kinetic energy of the fluidized material at the entrance into the discharge opening 26 is practically negligible. The fluidizing quantity of air is adjusted for a continuous flow of conveyed material through the separator, so that practically a flow balance arises from the adjustment.

The material flowing out of the discharge opening 26 does not fill the opening completely, but there remains within the opening, in fact radially at the outside, a flow cross section not used for the material but adjustable by the dampers 37. By means of the reduced pressure which prevails in the outer annular spaces 29 and 29a, air is sucked in through the discharge opening 26, and the dust developed during discharge is practically all sucked in with it and carried in the direction towards the filter hoses 20 in the outer annular space 29. Here the air sucked in from outside is cleaned and passes through the perforated plate 18, and flows out of the annular space 29a, through the pipe 16a to the outlet 16 and so through the suction device 17 to the surroundings. The air stream sucked into the discharge opening forms practically an air curtain, which hinders generation of dust on impact of the material onto a loading surface and on its spreading out.

The installation of a separator according to the invention is not limited to the outlet end of a conveyor pipe, but rather there exists the possibility of inserting it also upstream of the outlet end at a desired point in the conveyor pipe. For example, if it is desired to branch off a partial stream or streams at a level higher than the loading level, then the separator can be inserted correspondingly upstream in the conveyor pipe. In this case one will provide a pipe extending to the lower loading level and additionally surrounding the separator at least from the upper edge of the outlet openings. If this pipe is to be carried to significant length, then one can arrange an additional separator at its outlet end.

In plane the housing may be circular or polygonal. Although in page 1 the conveyor pipe enters into the housing at its top, it is also possible that this pipe enters through the side wall of the housing and terminates for example in a bend leading to a downward open end within the housing.

What is claimed is:

1. An apparatus for separating fine-grained material out of an air stream in which the material is suspended, comprising
    means defining a housing structure including a first enclosure wall having a floor, and
    fluidizing means located above the floor,
    a conveyor pipe having an open outlet end and extending therewith into said housing for introducing said stream downwardly into said housing,
    an expansion pipe open at both ends surrounding the open outlet end of the conveyor pipe and spaced above said fluidizing means,
    an air outlet defined in the upper part of said housing to discharge the air from the stream,
    suction means connected to said air outlet operable to establish and maintain a reduced pressure within the housing,
    filter means disposed upstream of said air outlet operable for restraining the exiting of the fine-grained material through said air outlet,
    at least one discharge opening defined in said housing above the fluidizing means and operable for discharging said fine-grained material,
    a second wall within the housing spaced from the first wall and extending downwardly from the upper portion of the housing at least to a level below the discharge opening, and
    inlet means associated with the floor operable for admitting fluidizing air to said fluidizing means thereby to convey the fine-grained material to the discharge opening.

2. Apparatus according to claim 1, wherein the second wall, in the neighborhood of its lower edge, extends at an inclination in the direction towards the center of the housing.

3. Apparatus according to claim 1, wherein the housing consists of an upper housing part which is connected with the conveyor pipe and is open downwards, and a lower housing part which is of smaller diameter than the upper part and is open upwards, and struts connecting the housing parts together at their respective inner and outer circumferences.

4. Apparatus according to claim 1, wherein the fluidizing means consists of fluidizing troughs on the floor.

5. Apparatus according to claim 1 including a wear plate arranged beneath the expansion pipe.

6. Apparatus according to claim 1 wherein the conveyor pipe extending substantially vertically downwards into the housing.

7. Apparatus according to claim 1, including a flow trough connected to the discharge opening.

8. Apparatus according to claim 7, wherein the flow trough is arranged extending radially and obliquely downwards.

9. Apparatus according to claim 1, including struts connecting the outlet end of the conveyor pipe and the expansion pipe.

10. Apparatus according to claim 9, wherein the outlet end of the conveyor pipe is formed like a nozzle.

11. Apparatus according to claim 1, wherein the fluidizing means covers the floor.

12. Apparatus according to claim 11, wherein the fluidizing means is divided into segments which can be pressurized individually with compressed air.

* * * * *